United States Patent
Barana et al.

(10) Patent No.: US 12,458,915 B2
(45) Date of Patent: Nov. 4, 2025

(54) TRANSPARENT COMPOSITE NANO-FIBRE BASED MULTI-LAYER TEXTILE

(71) Applicants: EMPA EIDGENÖSSISCHE MATERIALPRÜFUNGS- UND FORSCHUNGSANSTALT, Dübendorf (CH); ECOLE POLYTECHNIQUE FÉDÉRALE DE LAUSANNE (EPFL), Lausanne (CH)

(72) Inventors: Davide Barana, Winterthur (CH); Giuseppino Fortunato, St. Gallen (CH); Anne Géraldine Guex, St. Gallen (CH); René Rossi, Wil (CH); Thierry Pelet, Wollerau (CH); Klaus Schönenberger, Vufflens-la-Ville (CH); Sacha Sidjanski, Geneva (CH); Diane Baatard, Wollerau (CH)

(73) Assignees: EMPA EIDGENÖSSISCHE MATERIALPRÜFUNGS- UND FORSCHUNGSANSTALT, Dübendorf (CH); ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 480 days.

(21) Appl. No.: 17/913,354

(22) PCT Filed: Mar. 18, 2021

(86) PCT No.: PCT/EP2021/056902
§ 371 (c)(1),
(2) Date: Sep. 21, 2022

(87) PCT Pub. No.: WO2021/191037
PCT Pub. Date: Sep. 30, 2021

(65) Prior Publication Data
US 2023/0114145 A1   Apr. 13, 2023

(30) Foreign Application Priority Data

Mar. 23, 2020  (EP) .................................. 20164999

(51) Int. Cl.
*B01D 39/16* (2006.01)
*B01D 39/08* (2006.01)
(Continued)

(52) U.S. Cl.
CPC ......... *B01D 39/163* (2013.01); *B01D 39/083* (2013.01); *B01D 39/1692* (2013.01);
(Continued)

(58) Field of Classification Search
None
See application file for complete search history.

(56) References Cited

U.S. PATENT DOCUMENTS

| | | | |
|---|---|---|---|
| 11,168,419 B2 * | 11/2021 | Mecl | D04H 3/14 |
| 2014/0026897 A1 | 1/2014 | Saroch et al. | |
| 2018/0046223 A1 | 2/2018 | Hossain et al. | |

FOREIGN PATENT DOCUMENTS

| | | | | |
|---|---|---|---|---|
| CN | 107237047 A | | 10/2017 | |
| CN | 109109422 A | * | 1/2019 | ............... B32B 5/26 |
| KR | 20190123004 A | * | 10/2019 | ......... B01D 39/1623 |

OTHER PUBLICATIONS

CN109109422A_ENG (Espacenet machine translation of Yang) (Year: 2019).*

(Continued)

*Primary Examiner* — Gabriel E Gitman
(74) *Attorney, Agent, or Firm* — SERVILLA WHITNEY LLC (57) ABSTRACT

A composite multi-layer textile, comprising at least one nanofibre layer with nanofibres with diameters below 100 nm and one support layer with microfibres with diameters below three microns, wherein the layers were produced by (Continued)

electrospinning. The multi-layer textile shows a general transmittance at #=550 nm greater than 60%, which shows improved properties concerning transparency, breathability and robustness. This is achieved in that the at least one nanofibre layer and the support layer are fused, forming solid domains in the multi-layer textile, at closed areas of a pattern used in the production process, wherein the solid domains are separated from each other or connected, showing defined shapes, with regular or irregular spatial distribution, while the fibre morphology of nanofibres of the nanofibre layer and microfibres of support layer is preserved on top of the open areas beside the solid domains, attaining a general transmittance greater than that given by the sum of the individual layers.

17 Claims, 4 Drawing Sheets (51) Int. Cl.
    B32B 3/26      (2006.01)
    B32B 5/02      (2006.01)
    B32B 5/26      (2006.01)
    B32B 7/05      (2019.01)
    B32B 27/12     (2006.01)
    D01D 5/00      (2006.01)
    D04H 1/4334    (2012.01)
    D04H 1/4382    (2012.01)
    D04H 1/558     (2012.01)
    D04H 1/728     (2012.01)
    A62B 23/02     (2006.01)
(52) U.S. Cl.
    CPC .............. *B32B 3/266* (2013.01); *B32B 5/022* (2013.01); *B32B 5/024* (2013.01); *B32B 5/266* (2021.05); *B32B 5/275* (2021.05); *B32B 7/05* (2019.01); *B32B 27/12* (2013.01); *D01D 5/0076* (2013.01); *D01D 5/0084* (2013.01); *D04H 1/4334* (2013.01); *D04H 1/43838* (2020.05); *D04H 1/558* (2013.01); *D04H 1/728* (2013.01); *A62B 23/025* (2013.01); *B01D 2239/025* (2013.01); *B01D 2239/0618* (2013.01); *B01D 2239/0631* (2013.01); *B01D 2239/0654* (2013.01); *B01D 2239/0668* (2013.01); *B01D 2239/10* (2013.01); *B01D 2239/1233* (2013.01); *B01D 2239/1291* (2013.01); *B32B 2250/20* (2013.01); *B32B 2250/40* (2013.01); *B32B 2262/0276* (2013.01); *B32B 2262/0292* (2013.01); *B32B 2262/08* (2013.01); *B32B 2262/16* (2021.05); *B32B 2307/412* (2013.01); *B32B 2307/724* (2013.01); *B32B 2307/732* (2013.01); *B32B 2535/00* (2013.01); *B32B 2571/00* (2013.01)

(56) References Cited

OTHER PUBLICATIONS

KR20190123004A_ENG (Espacenet machine translation of Nah) (Year: 2019).*
PCT International Search Report in PCT/EP2021/056902 dated Jun. 24, 2021, 3 pages.
Zhang, Shichao, et al., "Highly Integrated Polysulfone/Polyacrylonitrile/Polyamide-6 Air Filter for Multilevel Physical Sieving Airborne Particles", ACS Applied Materials & Interfaces, vol. 8, No. 42, Oct. 12, 2016 (Oct. 12, 2016), pp. 29062-29072, XP055729786, US ISSN: 1944-8244, DOI:10. 1021/acsami .6b10094.

* cited by examiner

TRANSPARENT COMPOSITE NANO-FIBRE BASED MULTI-LAYER TEXTILE

CROSS-REFERENCE TO RELATED APPLICATIONS

This application is a National Phase entry of International Application No. PCT/EP2021/056902, filed Mar. 18, 2021, which claims priority to European Patent Application No. 20164999.3, filed Mar. 23, 2020, the disclosures of which are incorporated herein by reference in their entireties.

TECHNICAL FIELD

The present invention describes a composite multi-layer textile, comprising at least one nanofibre layer with nanofibres with diameters below 100 nm and one support layer with microfibres with diameters below five microns, wherein the layers were produced by electrospinning and the multi-layer textile shows an overall transmittance at $\lambda=555$ nm greater than 60%, a method for production of a transparent multi-layer textile and use of a multi-layer textile as part of a facial mask.

BACKGROUND

Multi-layer textiles have long been used in various applications. An interesting application is the use as a transparent and breathable mask or facial mask. Such high-performance textiles are continuously being developed in order to have optimal transparency and breathing properties. Recently, nanotechnology in the form of nanofibres has been introduced. The motivation is the well-known fact that nanofibres can be used to synthetize filter layers with superior filtration efficiency by reaching maximum air permeability. But due to the extremely small fibre diameter and weak nano-fibres, the stability of the resulting multilayer textile must be increased, to reach more robust multi-layer textiles.

From WO2016128844 it is known to use electrospinning for production of at least one layer of the resulting transparent composite multilayer textile. After electrospinning of at least one layer with nano-fibres, this layer is placed between two fabric layers, used as cover layers. The cover layers should be non-woven layers and the nano-fibre-layer should be electrospun onto a cover layer. The electrospinning is described in detail in WO2016128844 and even the coating step of the nano-fibre-layer on the cover layer is done via electrospinning.

Concerning scientific literature, several works concerning the possibility to prepare semi-transparent air filters via electrospinning were found in scientific literature. In Xia et al. [Xia T, Bian Y, Zhang L, Chen C. Relationship between pressure drop and face velocity for electrospun nanofibre filters. Energy Build. 2018; 158:987-999] the possibility to prepare transparent nanofibre membrane is presented and the possibility to use such elements to combine high particle removal efficiency with relatively low air resistance is demonstrated. Early approaches for scaling up the production of nanofibre based transparent air filters are reported in Xu et al. [Xu J, Liu C, Hsu P C, et al. Roll-to-Roll Transfer of Electrospun Nanofibre Film for High-Efficiency Transparent Air Filter. Nano Lett. 2016; 16 (2): 1270-1275].

However, a convincing solution for the cost-effective synthesis of a transparent facemask possessing adequate properties in all relevant aspects such as filtration, transparency, breathability and robustness has not been proposed yet.

DESCRIPTION OF THE INVENTION

The subject of the invention is to provide a transparent composite nano-fibre based multi-layer textile, a method for production of such a multi-layer textile and use of such a multi-layer textile as part of a facial mask.

The transparent composite nano-fibre based multi-layer textile has to be engineered to later for example manufacture see-through face masks with adequate mechanical stability and compliant with European regulation EN 14683 or EN 149: 2001+A1: 2009, the European standard for Personal Protective Equipment. A technical solution for the realization of cost-effective, transparent face masks possessing good performances in all the aforementioned key features— i.e. filtration efficiency, splash resistance and comfort—has not been disclosed yet.

The invention essentially provides a multi-layer textile as transparent polymeric filter that, due to the small size of its pores and adjustable fibre surface properties, has great filtration potential also towards micro- and nanoparticles, wherein the main target are bacteria, ranging between 0.5 to 3 microns. The material can be used to manufacture transparent filters of different kinds, capable to remove a wide range of harmful microbes and pollutants from air and other fluids.

BRIEF DESCRIPTION OF THE DRAWINGS

Further understanding of various aspects of the invention can be obtained by reference to the following detailed description in conjunction with the associated drawings, which are described briefly below.

It should be noted that in the differently described embodiments, the same parts are provided with the same reference symbols or the same component names, the disclosures contained in the entire description being able to be applied analogously to the same parts with the same reference symbols or the same component symbols.

A preferred exemplary embodiment of the subject matter of the invention is described below in conjunction with the attached drawings.

FIG. 1a shows a schematic view of a production method of electrospun nanofibre layer and support layer comprising microfibres with electrospinning and successive heat/pressure treatment on a patterned collector and a cooling step, showing the schematic setup, while FIG. 1b shows a schematic cross section view of a patterned multi-layer textile reached with the method according to FIG. 1a with two layers, while FIG. 1c shows a schematic cross section view of a multi-layer textile with one nanofibre layer sandwiched between two support layers, while

FIG. 2a shows a schematic view of varied production method with schematic setup, while FIG. 2b shows a schematic cross section view of a patterned multi-layer textile reached with the method according to FIG. 2a with solid domains of a nanofibre layer, a support layer and a patterned layer, while FIG. 2c shows a schematic cross section view of a multi-layer textile with two double layers of nanofibre layer and support layer sandwiching a patterned layer, while

FIG. 3a shows a schematics of a measurement setup, while

DESCRIPTION

A transparent composite multilayer textile 1 is disclosed, comprising a sandwich structure of at least one nanofibre layer 11 with ultra-thin nanofibres with diameters at least below 100 nm, in particular below 50 nm and at least one semi-transparent support layer 12, comprising larger, more robust, microfibres with preferentially diameters between 1-5 μm. At least one monolayer of nanofibre layer 11 and support layer 12 are used, each electrospun above each other in electrospinning steps I on a belt 2 of the production setup 0.

The size of the fibres constituting layers 11, 12 is optimized to reduce light scattering and improve transparency. The optimal fibre sizes have been selected according to predictions elaborated using the Mie theory of light scattering. The amount of light being scattered is lower for fibres having diameters noticeably smaller or larger than the wavelength of the incident light. Therefore, our strategy is based on multilayer textiles comprising low scattering fibres of different sizes that are respectively responsible for filtration and mechanical properties.

After electrospinning step I, a subsequent second step II in form of a thermo-mechanical treatment step II is applied to the multi-layer composite. The multi-layer composite is run through a press 3 or most preferred through a calender 3, with at least one press roll 30.

Figure 1A:
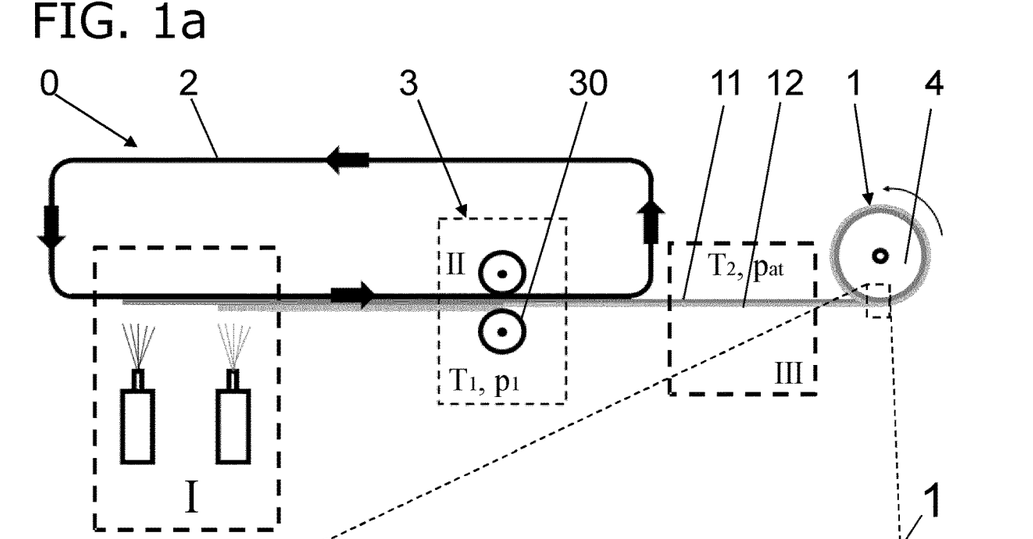
Figure 1B:
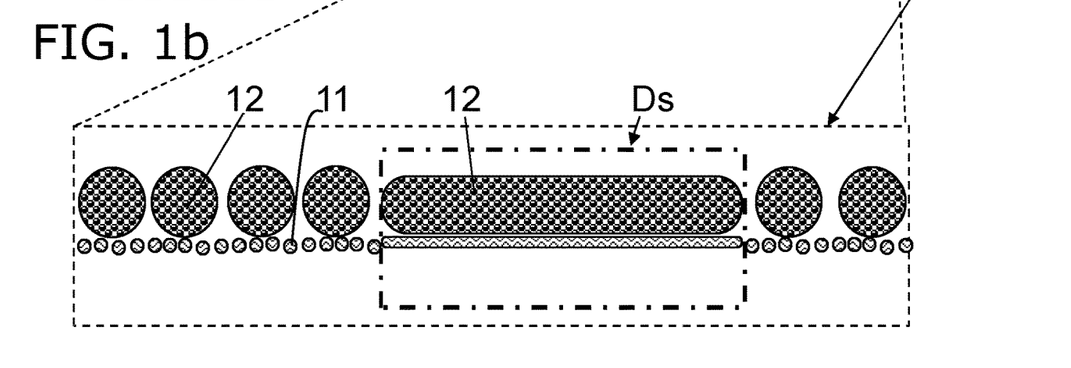

By applying
  pressures p1 of at least 1000N/cm2, most preferred greater or equal 1500N/cm2 and
  temperatures T1 of at least 70° C., most preferred greater or equal 80° C.,
  for a time interval Δt of up to a one-digit number of seconds, preferred greater or equal to 10 seconds, most preferred 30 seconds,
  the nanofibres of the nanofibre layer 11 and microfibres of the support layer 12 are fused together in specific locations into solid domains Ds, as depicted in FIG. 1b, which are highly transparent. Depending on the used materials and the fibre thickness, the transparency of the solid domains Ds is higher, than at the other areas.

The solid domains Ds provide strong bonding points between the layers 11, 12, greatly improving mechanical stability and transparency. According to the first method, the collector of electrospinning apparatus has a specific pattern of closed and open areas within a plane and will also serve as a template. Suitable patterned collectors could be metallic meshes or perforated metal sheets. At industrial scale the collector might conveniently be integrated in the belt 2, in order to be able to transfer the pattern to each layer 11, 12 and the final multi-layer textile 1.

In a typical design the multi-layer textile 1 presents a pattern, where domains constituted by in-plane aligned fibres are embedded in a continuous solid network resulting from the fusion of the fibres. The result is a fused patterned multi-layer structure with a pattern, corresponding to the pattern of the collector of the electrospinning apparatus. The connection areas of the different layers 11, 12 are formed by the pattern. The heat press and patterning is the result of the electrospinning step I on a patterned collector and subsequent thermo-mechanical treatment step II.

In a subsequent step a cooling step III is carried out, at temperatures T2 and pressures at below T1 and p1 according thermo-mechanical treatment step II. Temperatures T2 are well below T1, especially around room temperature below 30° C. The pressure pat is the atmospheric pressure on the resulting multi-layer textile 1, after leaving the press/calender 3.

The resulting multi-layer textile 1 with patterned fused at least partly connected nanofibre layer 11 and support layer 12 can then be processed further or wound up on a roll 4.

A schematic example of a transparent composite nanofibre based multilayer textile 1, showing a patterned structure is depicted in FIG. 1b. The pattern comprises solid domains Ds of nanofibre layer 11 and support layer 12, characterized by higher transparency and fibrous domains of nanofibre layer 11 and support layer 12 granting air permeability and filtration.

Fibres are organized in a multi-layer structure constituted by a nanofibre layer 11 of chitosan/polycaprolactone nanofibres and a support layer 12 of polyester/polyurethane microfibres fused as described above.

Figure 1C:
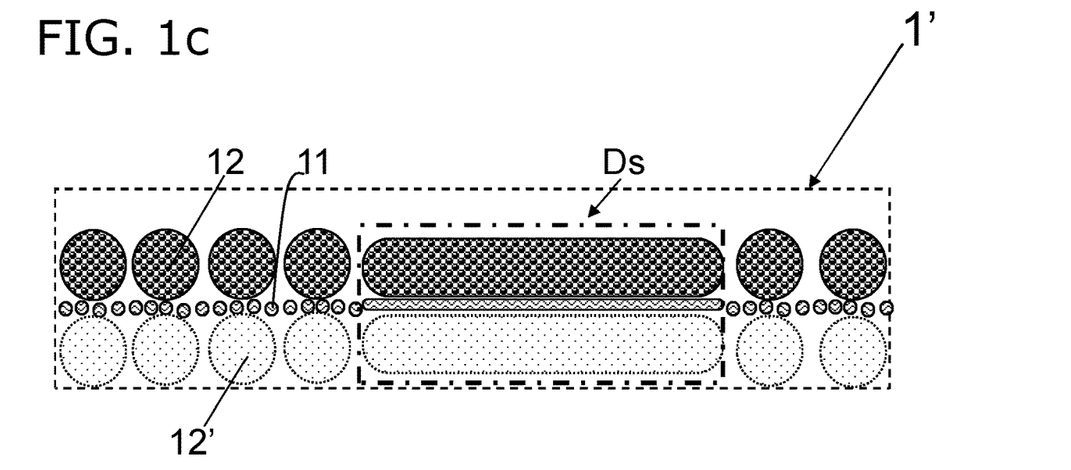

In a more preferred example a nanofibre layer 11 of chitosan/polycaprolactone nanofibres is embedded between two protective support layers 12, 12' of polyester/polyurethane microfibres, as schematically shown in FIG. 1c. All three layers 11, 12, 12' were sequentially spun on a special conductive collector of the electrospinning device and subsequently modified through the thermo-mechanical treatment step II as described above, to produce the solid domains Ds.

Figure 1D:
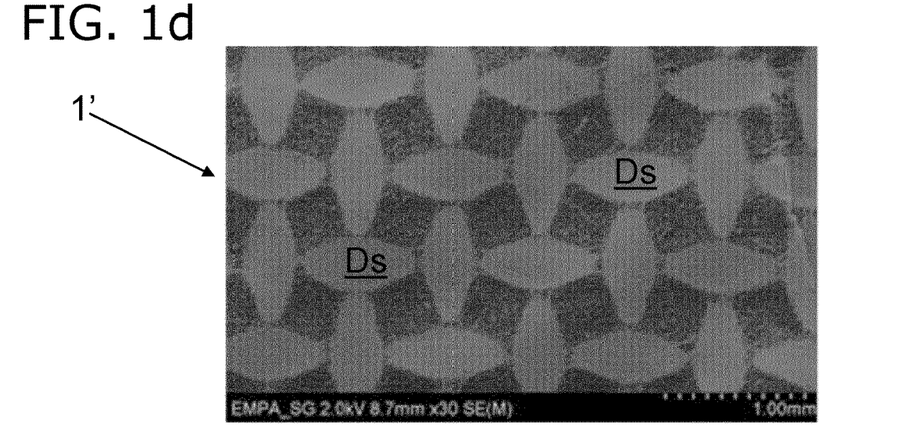
FIG. 1d shows a scanning electron microscopy image as top view of an example synthetized in our laboratory according sample of FIG. 1c.

The example of FIG. 1c was produced as described. The sample shows a structure according to the enclosed microscopic image FIG. 1d. The solid domains Ds of the multi-layer textile 1' are clearly visible and are corresponding to the pattern of the collector of the electrospinning apparatus.

The thickness of the nanofibre layer 11 and support layer 12 can be tuned to provide multi-layer textiles 1 with different properties, selected and appropriate. The fibres are electrospun in subsequent steps to conveniently build up a multi-layer architecture. At the end of the sequence of electrospinning step I, a multi-layer sheet comprising different fibre densities over open and close areas of the collector is formed. The multi-layer textile 1 is then hot pressed in the thermo-mechanical treatment step II. This step II could be conveniently performed at industrial scale through calendering. The combined effect of heat and pressure converts the polymeric fibres in contact with the closed areas of the collector in a solid compact film, whereas fibre morphology is preserved on top of the open areas of the collector. At the end of this stage the patterned multi-layer textile 1 is formed.

The fibre morphology of nanofibres of the nanofibre layer 11 and microfibres of support layer 12 is reaching over or running above the open areas of the structure beside the solid domains Ds, where they can be distinguished from each other.

The thermo-mechanical treatment step II allows to simultaneously bind the different layers 11, 11', 12, 12', 13 (as disclosed below) and to create a pattern with solid domains Ds in the patterned multi-layer textile 1, that increases transparency and mechanical resistance.

By reaching solid domains Ds embedded in a continuous network of nanofibres and microfibres of the at least one nanofibre layer 11 and at least one support layer 12 the size, the shape, the density, and the spatial disposition of the solid domains Ds can be modified to tune the final appearance and the barrier properties of the multi-layer textile 1.

To reach higher robustness, based on the above mentioned description, the production method was varied, also resulting in transparent composite nano-fibre based multi-layer textiles 1". With this slightly modified process, industrial production of such multi-layer textiles 1" is achieved.

Figure 2A:
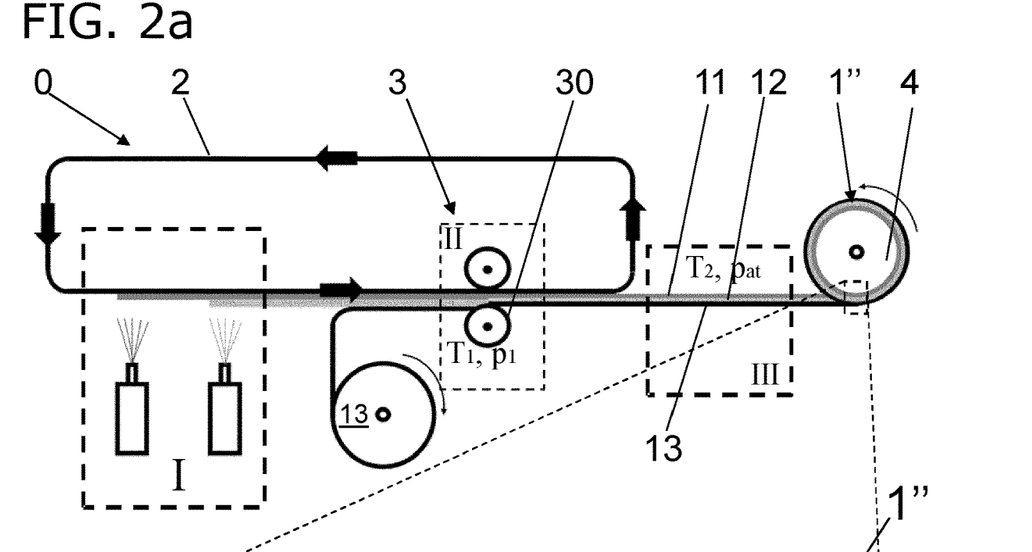

The production method starts with the electrospinning step I of the at least one nanofibre layer 11 and the at least one support layer 12 with microfibres on the belt 2 and a collector of electrospinning apparatus as described above. This time, the collector does not need to show a press pattern. The electrospun layers 11, 12 are transported further and provided with an additional patterned layer 13 or a porous substrate 13, preferably from a role as depicted in FIG. 2a. Before the here three layers 11, 12, 13 are fed into the press 3 or calender 3, where the layers 11, 12, 13 undergo the heat/pressure treatment in the thermo-mechanical treatment step II.

By applying
- pressures p1 of at least 1000N/cm2, most preferred greater or equal 1500N/cm2 and
- temperatures T1 of at least 70° C., most preferred greater or equal 80° C.,
- for a time interval Δt of up to a one-digit number of seconds, preferred greater or equal to 10 seconds, most preferred 30 seconds,
- the nanofibres of the nanofibre layer 11 and the microfibres of the support layer 12 and the material of the patterned layer 13 are fused together, forming solid domains Ds at the closed areas of the patterned layer 13, which are highly transparent.

Depending on the used materials and the fibre thickness, the transparency of the solid domains Ds is higher, than at the other areas.

Because of the introduced patterned layer/porous substrate layer 13, the nanofibre layer 11 and the support layer 12 are connected at the surface of the patterned layer/porous layer 13.

The patterned layer/porous substrate layer 13 is formed as a polymeric mesh with the pattern, comprising openings and connection webs. The patterned layer/porous substrate layer 13 can be a woven fabric or a fleece, comprising fibres with diameters of 20 microns and more, in particular about 50 microns to 200 microns, forming the connection webs. At least 30% of the surface of the patterned layer/porous substrate layer 13 should be open, forming a multiplicity of openings. The pattern is most preferred regular, but also could be irregular formed.

The patterned layer/porous substrate layer 13 can also be formed as a foil of a thermoplastic material with a number of through holes as openings and a lattice-like structure as connection webs, while at least 30% of the surface should be open. The apertures of the through holes have to be chosen in such a way, that the connections webs of the lattice-like structure are wider than 20 microns and more, in particular 50 microns and more.

The patterned layer 13 has to be semitransparent or transparent, to later reach as high transparency as possible. Such patterned layer 13 is introduced after electrospinning step I, before thermo-mechanical treatment step II and further cast to the layer 11, 12 as a lost form.

Figure 2B:
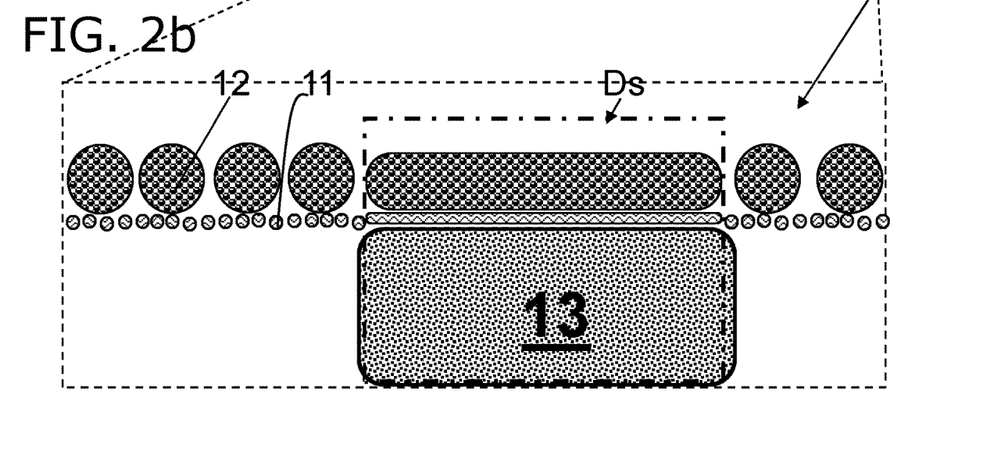

Due to the pattern on or in the patterned layer 13 and the thermo-mechanical treatment step II, nanofibre layer 11 and support layer 12 are fused at the grid connections or closed areas of the lattice-like structure of the patterned layer 13, as depicted in FIG. 2b.

Figure 2C:
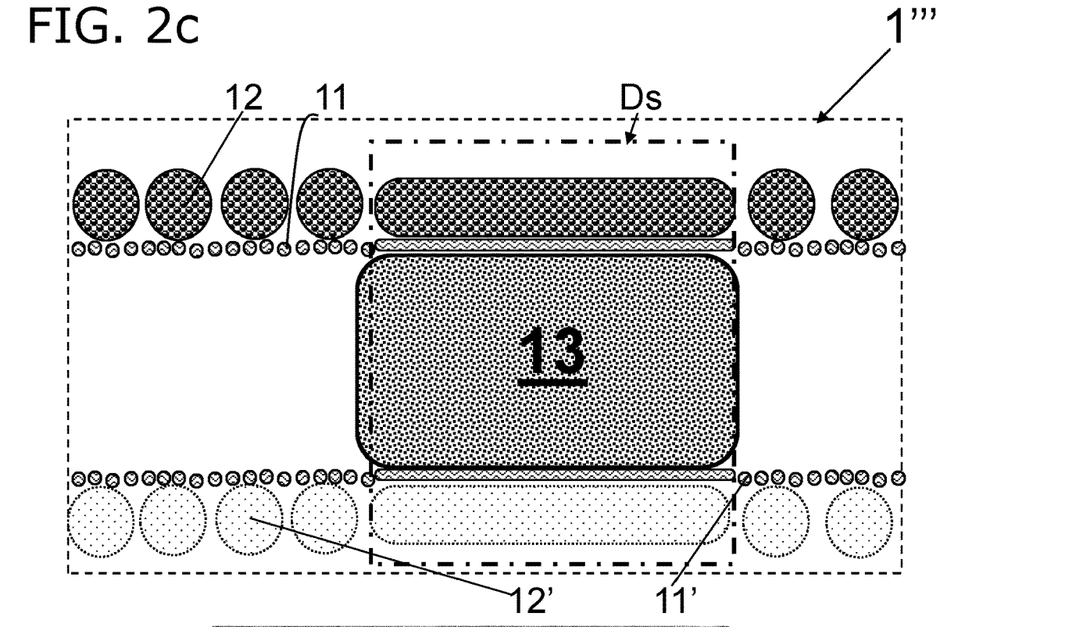
Figure 2D:
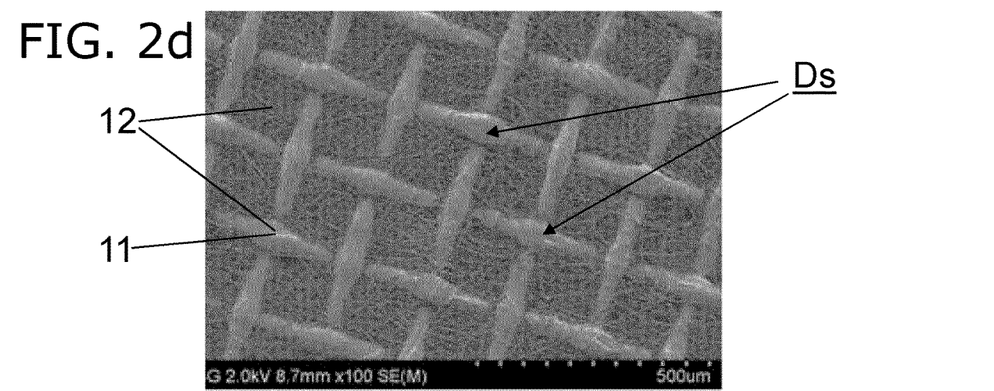
FIGS. 2d and 2e are showing scanning electron microscopy image as top views of an example synthetized according the method showing in FIG. 2a at increasing magnifications.
Figure 2E:
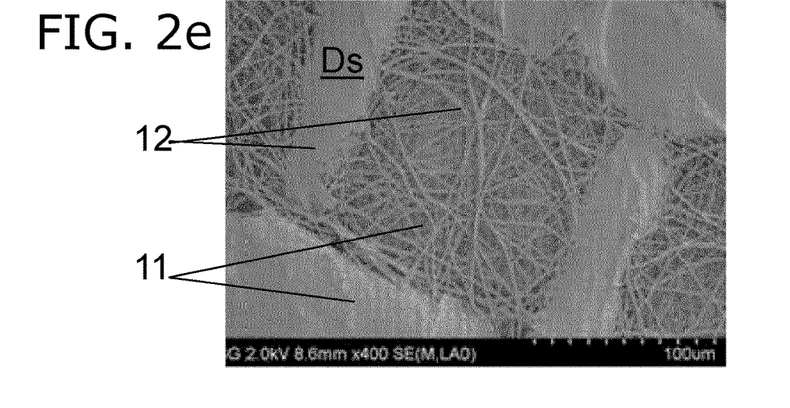

If two double layers of nanofibre layer 11, 11' and support layer 12, 12' are surrounding a patterned layer 13 and fused with each other and the patterned layer 13, a multi-layer textile 1"" according schematic view of FIG. 2c is reached. We produced such a multi-layer textile 1'" with a method described above, which is depicted in the SEM images FIGS. 2d and 2e.

Due to the thermo-mechanical treatment step II at T1, p1 and the subsequent cooling step III at T2, pat, as mentioned above, the solid domains Ds are formed. In this case, the patterned layer 13 remains in the resulting multi-layer textile 1. The pattern builds the fused positions of the nanofibres and microfibres of layers 11, 12. The patterned layer/porous substrate layer 13 is used as lost form, while the nanofibres and microfibres are also permanently attached to the patterned layer/porous substrate layer 13. The here described fused connections are permanently connecting different layers.

While the resulting pattern of solid domains Ds or the islands of the pattern are similar in both manufacturing processes, the first procedure can be run without introducing the patterned layer 13.

Particularly preferred is the use of the nanofibre layer 11, 11' comprising chitosan/polycaprolactone nanofibres and the support layer 12, 12' comprising polyester/polyurethane microfibres.

The disclosed methods are resulting in multi-layer textiles 1, 1', 1", 1'" with a transmittance T %, which is in general the fraction of incident electromagnetic power in the visible spectrum that is transmitted through a sample, greater than 50%. Most preferred the transmittance of the final multi-layer textiles 1, 1', 1", 1'" after thermo-mechanical treatment step I with selective melting of some areas should be greater than 60%.

Each individual layer 11, 11', 12, 12', 13 should block or scatter no more than 20% of the visible light, that means that 80% of the incident photons in the visible spectrum can cross the membrane without being absorbed or deflected. The transmittance (T %) must be greater than 80% at λ=555 nm. The light wavelength of 555 nm correspond to the peak sensitivity of human vision, therefore the T % at this specific wavelength is particularly relevant for our targeted application.

In the practice we were able to achieve the following results:
- nanofibre layer 11 with nanofibres of 50 nm diameter: T %>90
- support layer 12 with microfibres of 1-2 µm diameter: T %>80
- patterned layer 13 as woven commercial polymeric mesh: T %=70 before modification, T %=80 after modification by hot pressing.

The transmittance of the final overall or general multi-layer textiles 1, 1', 1", 1'" is given by the product of the individual layers. By selectively melting the fibres in some areas, reaching solid domains Ds, we can attain transmittance values greater than that given by the sum of the individual components 11, 11', 12, 12', 13.

The size of pattern islands of the pattern of the collector of the electrospinning apparatus or of the pattern islands of the pattern of the patterned layer 13 and therewith the lateral widths of the later solid domains Ds might vary between 1 cm and 10 nm, preferably between 1 mm and 1 µm, more preferably between 100 µm and 10 µm at its largest point.

The pattern islands having a maximum dimension lesser than 100 µm have the advantage to be practically invisible to the naked eye, yielding a multi-layer textile 1 with a homogenous look. The pattern islands might be placed following a regular pattern or an irregular one. The pattern might be homogenous through the multi-layer textile 1 or presenting a gradient in pattern islands concentration to confer specific characteristics to different areas of the multi-layer textile 1 or later facial mask.

The total pattern island and therewith the resulting solid domain Ds surface should account for a value between 5% and 95% of the total surface of the multi-layer textile 1, preferably between 15% and 85%, more preferably between 30% and 70%.

The thickness of the compact polymeric areas respectively the solid domains Ds can be tuned as well as film composition. The thickness of the solid domains Ds might vary between 100 nm and 0.1 cm, preferably between 1 µm and 1 mm, more preferably between 10 µm and 100 µm.

The multi-layer textile 1, 1', 1", 1''' can be used as a part of a facial mask. Such multi-layer textiles 1, 1', 1", 1''' can also be used in filtration applications as filtration membrane or as packaging material.

To use chitosan-polycaprolactone blends for nanofibre layer 11 and/or support layer 12 is most preferred. Chitosan is largely available, biodegradable, renewable, and it can be extracted from different biomasses. Chitosan is non-cytotoxic and incorporates intrinsic anti-microbial properties and can be electrospun. In addition, the peculiar molecular structure, characterized by a generous amount of polar amino groups, is expected to enhance filtration efficiency. Polycaprolactone is also highly biocompatible and biodegradable. The chitosan based functional multi-layer textiles 1 are highly transparent (T>90%) and the reduced pore size is linked to promising filtration properties.

The main limit can be found in the mechanical stability of these small fibres, therefore we found larger support fibres for the support layer 12. The support fibres that we developed are based on polylactides, polyurethanes and blends thereof. Such support fibres have adequate mechanical properties. Low crystallinity and large diameters minimize light scattering. Interestingly both polymers are biodegradable.

Polylactic acid is entirely produced from starch, a renewable feedstock, while the polyurethanes are synthetized using both fossil and renewable raw materials. To summarize, we developed formulation that allowed us to control the size of the fibres, as well as their surface chemistry and crystallinity.

By controlling these critical parameters we enhanced/balanced transparency, mechanical properties and filtration efficiency. All polymers are biodegradable, therefore the final products would have a limited environmental impact if disposed in landfills or dispersed into the environment (e.g. no generation of persistent microplastics). In addition a large fraction of the raw materials is also produced from renewable resources, potentially, but not automatically, lowering carbon footprint.

Similar practical results can be obtained with many different polymer or polymer combination applying well-known principles of polymer chemistry and engineering. Virtually any polymer or polymer combination shapeable into transparent films and/or fibres can be potentially used. To optimize the characteristics of the materials it is also convenient to use suitable additives (curing agents, plasticizers, surfactants, clarifying agents, etc.) which might constitute up to 30% in weight of the raw materials.

Polymers suitable for film and fibre production might include:
Polyolefins: LDPE, HDPE, PP, PS, PAN, PVC, . . .
Polyesters: PET, PLA, PCL, PHA, PHB, . . .
Polycarbonate: PC, . . .
Polyethers: PEG, PEO, . . .
Polyamides, polyimides, polyaramides: PA (e.g. Nylon), PI, PAr (e.g. Kevlar), . . .
Polyurethanes: PU, TPU, . . .
Silicon polymers: PDMS, . . .
Miscellaneous polymers: PVA, PVP, PMMA, PVAC, . . .
Cellulose and its derivatives: Ethyl Cellulose, Methyl Cellulose, Cellulose acetate, . . .
Other natural polymers: hemicelluloses, chitin, chitosan, starch, collagen (gelatin), . . .

It is most advantageous to use biocompatible, biodegradable and antibacterial thermoplastic polymers for the different layers 11, 12, 12', 13.

The polymer blends for the different layer 11, 11', 12, 12', 13 are constituted by at least one kind of thermoplastic, thermosetting, elastomeric or thermoplastic-elastomer polymer. More than one polymer might be used forming blends and composites to infer the desired final properties to the textile.

Two or more different kinds of fibres might be present in the nanofibre layer 11 support layer 12, 12' and/or patterned layer 13, in more than a monolayer, produced be electrospinning. The rest of the production methods as stated above can be used accordingly. The forming of the solid domains Ds is the most important feature.

Applications for the here disclosed masks are hygienic mask, face mask, surgical mask or procedure mask for different fields of application. Also protective clothing could be transparent for aesthetical reasons. Surgical drapes should be transparent to allow to better monitor the patient.

Another application is use as window screen, a semi-transparent windows screen or haze window screen with filtration of fine particulate (PM 2.5, PM 10).

Such composite multi-layer textiles 1 could also be used as packaging materials, as highly breathable, air-permeable semi-transparent membrane for special packaging applications. These composite multi-layer textiles stop aerosol droplets, pollens, bacteria, spores, but allow vision of the product and very high transpiration.

Persons skilled know setups for determination of optical transparencies. Here the transparency was quantified by measuring the transmittance using a UV-vis spectrophotometer "Cary 4000" from Agilent. The sample is typically placed orthogonally to the incident light using a solid sample holder (Agilent) with an aperture mask of 1 cm$^2$. Of course, analog measurements are possible with common optical spectrometers with aperture masks up to a few square centimeters working in the interesting wavelenght range.

In praxis the transparent filter 1 is composed of mainly two parts: the electrospun nanofibers mats 11 as filtration elements, and the support material made of a PLA mesh 12, which is commercially available. To increase the transparency of the final product the PLA mesh was pressed for 30 seconds at 120° C. and applying a pressure of 50 bar. The pristine PLA mesh has intrinsically antistatic properties that prevent fiber deposition during the electrospinning process. Therefore, a skin-compatible surfactant (TWEEN 80) acting as an antistatic substance was chosen to coat the mesh by a dip-coated technique using a 1.0% wt. solution in ethanol. Subsequently, the so-prepared substrate (pressed PLA+

TWEEN 80) was directly coated with a thin layer (about 0.1 g/m$^2$) of Polyamide-11 (PA11) electrospun nanofibers using "Nanospider", Pilot-scale electrospinning equipment from Elmarco. A solution of 6% wt. in anisole formic acid was used to obtain fibers with an average diameter of 72±29 nm.

Figure 3A:
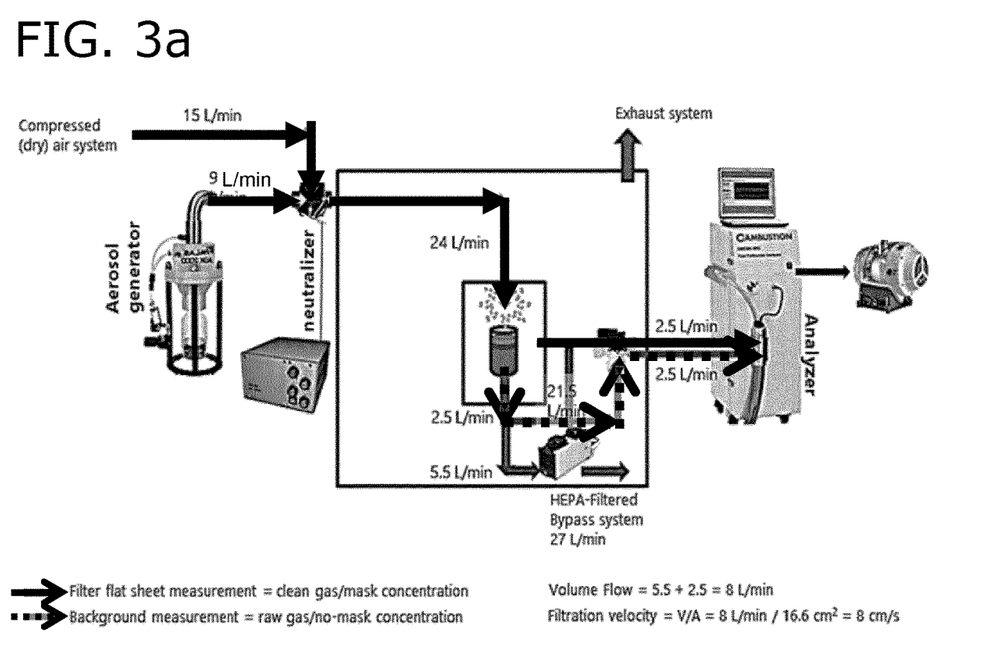

The filtration efficiency was measured using a home-made set-up, depicted in FIG. 3a. In each test were used:
- a circular test specimen of diameter of 46 mm; an aerosol consisting of neutralized sugar particles of 20 to 2000 nm diameter;
- a pump system generated a constant air flow of 8 L/min (air velocity of 8 cm/s) through the specimen;
- a particle analyzer "Cambustion DMS500" measured (real-time) the concentration of the aerosol diffusing through the specimen. The particle filtration efficiency is given in percentage and determined after achieving a steady-state flow of particles (after approximately 3 minutes) by comparison the aerosol concentration with and without the filter system.

The transparent composite nano-fibre based multilayer textile 1 PLA-PA11 system showed good filtration efficiency against the neutralized fructose particle aerosol, which is >90% for 1 μm mobility particle diameter.

Figure 3B:
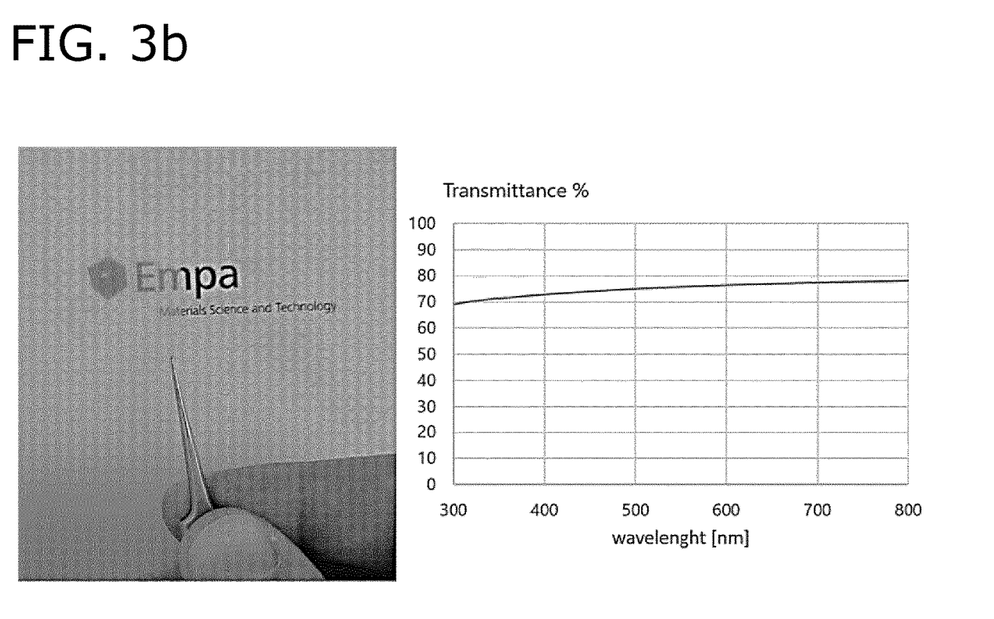
FIG. 3b shows a photograph of a resulting transparent composite nano-fibre based multilayer textile and a transmittance curve in a wavelenght range between 300 and 800 nm.

The air permeability was evaluated following the EN-14683:2019 standard for medical face masks. the air permeability is related to the pressure drop of the tested material measured by applying a flow of 27 cm/s. The transparent composite nano-fibre based multilayer textile 1 PLA-PA11 filter showed a pressure drop of 9 Pa/cm$^2$ (the limit for Type I and II medical face mask is 40 Pa/cm$^2$ according to EN-14683:2019). The transparency was quantified by measuring the transmittance of the filter using a UV-vis spectrophotometer "Cary 4000" from Agilent. The sample is placed orthogonally to the incident light using a solid sample holder (Agilent) with an aperture mask of 1 cm$^2$. Assuming that air has a transmittance of 100%, in our case, the transparent composite nano-fibre based multilayer textile 1 PLA-PA11 filter has a 76% transmittance at $\lambda=555$ nm (visible light span from about 400 to 800 nm). In the figure below a picture of the transparent composite nano-fibre based multilayer textile 1 PLA-PA11 sample is reported together with the UV-vis spectrum in FIG. 3b.

LIST OF REFERENCE NUMERALS

0 production setup
1 transparent composite nano-fibre based multilayer textile/membrane
11 nanofibre layer (diameter below 100 nm)
12, 12' support layer with microfibres (diameter 1-2 microns)
13 patterned layer/porous substrate layer (woven/melt-spun, melt-blow/foil with openings)
2 belt (collector of electrospinning apparatus can form part of belt)
3 press/calender
30 press roll
4 roll (for multi-layer textile)
I electrospinning step
II thermo-mechanical treatment step (T1, p1)
III cooling step (T2, pat)
Ds solid domains (thickness transversely between 1 μm and 100 μm, lateral width between 10 μm and 100 μm)

What is claimed is:

1. A composite multi-layer textile, comprising at least one nanofibre layer with nanofibres with diameters below 100 nm and at least one support layer with microfibres with diameters below five microns,
    wherein the layers were produced by an electrospinning process and the multi-layer textile shows an overall transmittance at $\lambda=555$ nm greater than 50%,
    wherein the at least one nanofibre layer and the at least one support layer are fused, forming solid domains in the multi-layer textile, at closed areas of a pattern used in the production process,
    wherein the solid domains are separated from each other or connected, showing defined shapes, with regular or irregular spatial distribution, while the fibre morphologies of the nanofibres of the at least one nanofibre layer and the microfibres of the at least one support layer are preserved beside the solid domains, attaining an overall transmittance of the entire multi-layer textile greater than the transmittance given by the sum of the individual layers' transmittances.

2. The composite multi-layer textile according to claim 1, wherein the multi-layer textile comprises a patterned layer with a pattern of closed and open areas, on a top or a bottom of an individual layer of the multi-layer textile, and the solid domains are formed at contact positions of the at least one nanofibre layer or the at least one support layer and the patterned layer.

3. The composite multi-layer textile according to claim 1, wherein the multi-layer textile comprises one nanofibre layer sandwiched between two outer support layers, showing solid domains at a fused position of all three layers.

4. The composite multi-layer textile according to claim 2, wherein the patterned layer is sandwiched between two nanofibre layers and two support layers, the patterned layer in direct contact with each of the two nanofibre layers.

5. The composite multi-layer textile according to claim 2, wherein the solid domains are formed as contact areas, connecting a layer of the at least one nanofibre layer, a layer of the at least one support layer, and the patterned layer, showing thicknesses between 1 μm and 100 μm.

6. The composite multi-layer textile according to claim 5, wherein the solid domains show maximal lateral widths between 10 μm and 100 μm at its widest points.

7. The composite multi-layer textile according to claim 2, wherein the solid domains on the multi-layer textile have a value between 30% and 70% of a total surface of the multi-layer textile.

8. The composite multi-layer textile according to claim 2, wherein the transverse thickness of the patterned layer varies between 1 μm and 100 μm and the patterned layer is a woven polymeric mesh.

9. The composite multi-layer textile according to claim 2, wherein the transverse thickness of the patterned layer varies between 1 μm and 100 μm and is formed by a thermoplastic material with a number of through holes as openings and a lattice-like structure as connection webs, while at least 30% of the total surface of the thermoplastic material is open.

10. The composite multi-layer textile according to claim 1, wherein the at least one nanofibre layer comprises chitosan/polycaprolactone nanofibres and the at least one support layer comprises polyester/polyurethane microfibres.

11. A method for production of an optically transparent multi-layer textile, which shows an overall transmittance at $\lambda=555$ nm greater than 50% comprising the steps of:
    electrospinning of at least one nanofibre layer and at least one support layer on a belt of a production setup on a patterned collector of an electrospinning apparatus or on a supplied patterned layer/porous substrate layer to form the at least one electrospun nanofibre layer and the at least one electrospun support layer, each of the patterned collector and the supplied patterned layer/porous substrate showing open and closed areas;

transport of the belt with the at least one electrospun nanofibre layer and the at least one electrospun support layer thereon to a hot press or calender;

implementation of a thermo-mechanical treatment step at an elevated temperature higher than room temperature and an elevated pressure of at least 1000N/cm2 for a minimum time interval, wherein the at least one electrospun nanofibre layer and the at least one electrospun support layer are fused at closed areas of the patterned collector or a pattern of the supplied patterned layer/porous substrate layer, forming a multiplicity of solid domains in the multi-layer textile, before a cooling step is carried out at lowered temperatures and pressures.

12. The method for production of a transparent multi-layer textile according to claim 11, wherein the thermo-mechanical treatment step is carried out at temperatures of at least 70° C.

13. The method according to claim 11, wherein the minimum time interval is greater than or equal to 10 seconds.

14. The method according to claim 11, wherein the patterned collector of the electrospinning apparatus is formed by a metallic mesh or a perforated metal sheet and builds a part of or is integrated in the belt.

15. The method according to claim 11, wherein the patterned layer/porous substrate layer is a woven polymeric mesh or formed by a thermoplastic foil with a number of through holes as openings and a lattice-like structure as connection webs.

16. The method according to claim 11, wherein after the cooling step, the multi-layer textile is rolled onto a roll.

17. A method of using a multi-layer textile as part of a facial mask as a medical device and/or as personal protective equipment, including the step of providing the composite multi-layer textile according to claim 1.

* * * * *